Dec. 28, 1954     H. D. WOODHAM     2,698,403

AUTOMOTIVE VEHICLE SIGNAL DEVICE

Filed June 7, 1950

INVENTOR.
Harry D. Woodham
BY
Wallace and Cannon
Attorneys

United States Patent Office 2,698,403
Patented Dec. 28, 1954

2,698,403

AUTOMOTIVE VEHICLE SIGNAL DEVICE

Harry D. Woodham, Chicago, Ill.

Application June 7, 1950, Serial No. 166,674

10 Claims. (Cl. 315—80)

This invention relates to signal devices and more particularly to signal devices for automotive vehicles, and the like, which are capable of selectively indicating to the motorist following the automotive vehicle on which the device is installed, whether the vehicle is accelerating, slowing, or stopping.

Various types of signal devices of the general type with which my invention is concerned, have been known heretofore. However, these devices which have been previously known have had several inherent disadvantages such as, for example, being complicated in construction and operation; embodying complicated, and in many instances, a multitude of separate electric circuits; being difficult to attach to an automobile; and not readily lending themselves to incorporation in the established electric circuits of automobiles and the like. It is a primary object of my invention to overcome these, and other disadvantages inherent in signal devices heretofore known in the art.

Another important object of my invention is to afford a novel signal device of the aforementioned type, embodying three individual signal elements, each capable of emitting light of a distinctive color, the signal elements being connected in a novel series-parallel circuit wherein the individual lamps are selectively illuminated according to whether the vehicle, with which the signal device is associated, is accelerating, slowing, or stopping.

A further object of my invention is to provide a signal device of the aforementioned type, embodying parts constituted and arranged in a novel and expeditious manner and including three parallel circuits constituted and arranged in the novel manner whereby control of the illumination of the various signal elements may be effected in a novel and expeditious manner to indicate to a motorist, following the vehicle in which the signal device is incorporated, as to whether the vehicle is accelerating, slowing, or stopping.

More specifically, a further object of my invention is to provide a signal device embodying three signal elements, including distinctively colored electric lamps and wherein the signal device includes three electric circuits connected in parallel to each other, one of the circuits including only one of the signal elements, the second of the circuits including only two of the signal elements connected in series, and the third of the circuits including the three signal elements connected in series, illumination of the signal elements being controlled in a novel and expeditious manner whereby in the third circuit, only one of the signal elements is illuminated to indicate that the automobile is accelerating, in the second circuit only one of the signal elements is illuminated to indicate that the automobile is slowing, and in the third circuit the one signal element embodied therein is illuminated to indicate that the automobile is stopping.

Yet another object of my invention is to afford a signal device of the aforementioned type wherein illumination of the selected signal elements in the aforementioned second and third circuits, are controlled by the manually operable accelerator means embodied in the vehicle and the illumination of the one signal element in the aforesaid one circuit is controlled by the manually operable braking means, such as the brake pedal in such a vehicle.

Yet another object of my invention is to afford a signal device of the aforementioned type wherein the signal elements embodied in the device are of a predetermined relative current capacity so that the signal elements in the various circuits are selectively energized in a manner wherein only the desired signal element affords an illuminated signal in that particular circuit.

Another object of my invention is to afford a novel signal device of the aforementioned type which may be readily mounted on an automotive vehicle, and the like, and which may be readily incorporated in the presently existing electrical system of such a vehicle.

Other and further objects of the present invention will be apparent from the following description and claims and are illustrated in the accompanying drawing, which, by way of illustration, shows a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

Figure 1:
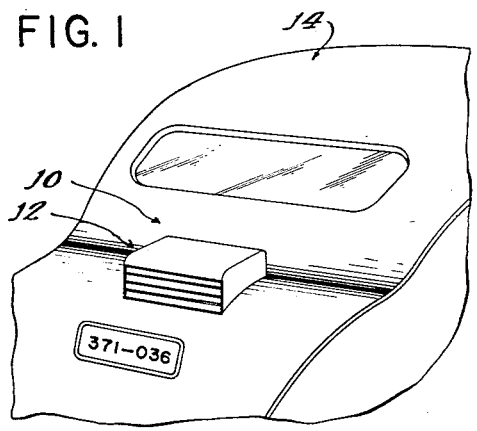
Fig. 1 is a perspective view of a signal device embodying the principles of my invention, and showing the device mounted in operative position on a portion of an automotive vehicle.

In the drawings, a signal device 10 embodying a housing 12, is shown mounted on the rear end portion of an automobile 14. As will be discussed in greater detail hereinafter, the signal device 10 embodied three signal elements GR, AM, and RE, which are preferably operable to emit visible green-colored, amber-colored, and red-colored, light signals to advise other motorists, and the like, the conditions under which the automobile 14 is operating, that is, whether the automobile 14 is accelerating, slowing, or stopping, respectively.

It will be appreciated that the term "accelerating" is used herein, as applied to an automobile on which my device is embodied, to include not only conditions under which the automobile is actually accelerating, but also conditions under which the automobile is progressing under normal driving conditions with the accelerator of the automobile actuated from normal "idle" position to "power on" position.

The housing 12 embodies a top wall 16, a rear wall 17 and two end walls 18 and 19, preferably constructed of a single sheet of suitable material, such as, for example, sheet steel. A front wall 21, including two parallel panels 21a and 21b, Figs. 2 and 3, constructed of suitable material, such as, for example, sheet steel, is mounted in and preferably welded to, the front end portion of the housing 12, inwardly of the front edge of the top wall 16 and in parallel relation to the rear wall 17. The central portion of the two panels 21a and 21b of the front wall 21, are cut out to afford a substantially rectangular shaped opening therethrough, so that the panels 21a and 21b afford, in effect, a pair of frame members having a substantially rectangular shaped sight opening 23 therethrough. A suitable pane of glass or other suitable transparent material 24 is mounted in the front wall 21 between the panels 21a and 21b and extends across the sight opening 23, the glass 24 being secured to the panels 21a and 21b by suitable means such as screws 25. The glass 24 is preferably of the "frosted" type to thereby partially screen the interior of the housing 12 from view, while readily permitting the viewing of signal lamps therethrough.

Figure 3:
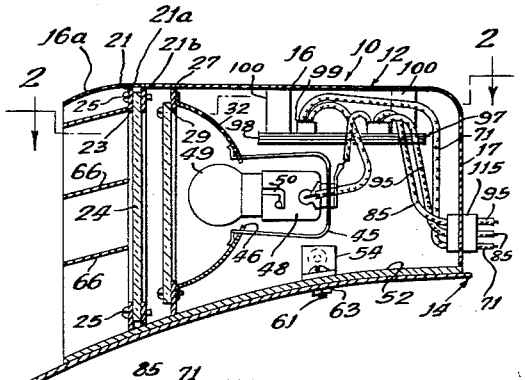
Fig. 3 is a sectional view taken substantially along the line 3—3 in Fig. 2.
Figure 2:
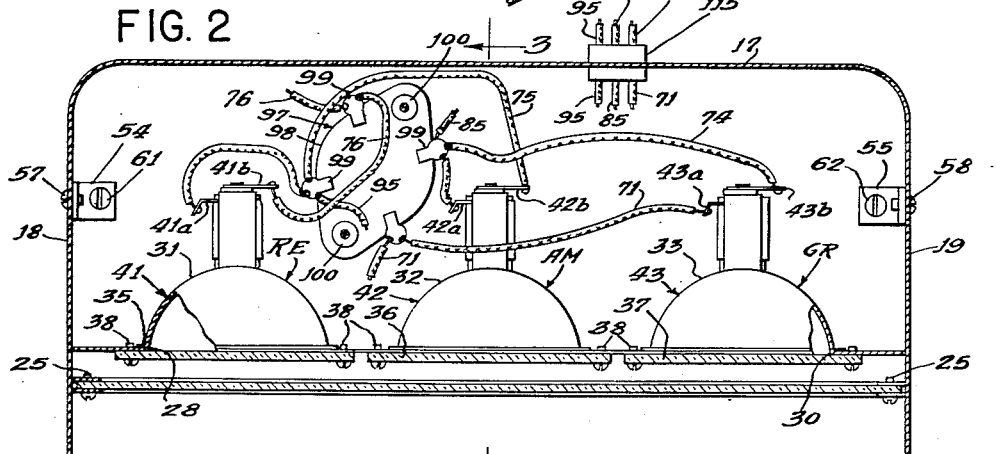
Fig. 2 is a longitudinal sectional view of the signal device shown in Fig. 1, looking downwardly in the direction of the arrows 2—2 in Fig. 3.

Between the front wall 21 and the rear wall 17, a partition member 27, similar in construction to the panels 21a and 21b is mounted in the housing 12 and has three substantially square shaped sight openings 28, 29 and 30, Figs. 2 and 3, formed in the central portion thereof, the openings 28—30 being disposed in spaced relation to each other along the longitudinal center of the partition member 27 in horizontal alignment with the sight opening 23. Three substantially bell-shaped reflectors 31, 32 and 33, are mounted on and preferably welded to, the side of the partition wall 27 disposed toward the rear wall 17, the mouth or opening of the bell shaped reflectors 31—33 facing outwardly toward the front wall 21 in alignment with the openings 28, 29 and 30, respectively. Three panes of reflective glass, or other suitable transparent material, 35, 36 and 37 are mounted on the front face of the partition wall 27 by suitable means such as screws 38 in position to cover the openings 27, 28, and 29, respectively. The panes of glass 35, 36 and 37 are preferably, red, amber, and green in color, respectively, for purposes which will be discussed in greater detail presently.

The reflectors 31—33 comprise integral portions of electric lamps 41, 42 and 43, respectively, Fig. 2, each of which includes a spring clip 45 mounted in an opening 46 in the rear end portion of the reflectors 31—33, Fig. 3. A lamp socket 48 is mounted on each of the spring clips 45 and projects inwardly toward the opening 46, and is adapted to receive an electric bulb 49, interconnection of the bulb 49 with the socket 48 being effected through any one of several different types of connections well known in the art, such as, for example, the bayonet-type connection 50, Fig. 3.

A bottom wall or base 52 having upwardly projecting angle brackets 54 and 55 mounted on the opposite end portions thereof, Fig. 2, is mounted on the lower end portion of the housing 12 and may be secured thereto in sealed engagement therewith, by suitable means such as screws 57 and 58 extending through the end walls 18 and 19 and threadedly engaged with the brackets 54 and 55. The housing 12 may be mounted in rearwardly facing position on a suitable portion of the rear end of the automobile 14, Fig. 2, by suitable means such as, for example, bolts 61 and 62 extending through the brackets 54 and 55 and a portion of the automobile 14, and held in such position by nuts 63, Fig. 3.

As will be discussed in greater detail presently in the operation of the signal device 10, when the automotive vehicle 14 on which the signal device 10 is mounted is accelerating or being driven at a constant speed, the signal lamp 43 is illuminated sufficiently that the light shining through the green pane of glass 37 affords a readily observable green signal to a car following the vehicle 14, but the signal lamps 41 and 42 are not energized sufficiently to afford a signal. On the other hand, when the automobile 14 is slowing because the driver has released the accelerator, the signal lamps 41 and 43 are not illuminated sufficiently to afford a signal to a following car, but the lamp 42 is illuminated to afford a readily observable amber, "warning" signal to the following motorist. Also, when the automobile 14 is being stopped by manual application of the brakes thereof, the signal lamps 42 and 43 are not illuminated to afford a signal to the following motorist, but the signal lamp 31 is illuminated and affords a readily observable red, "stop" signal to the following motorist.

It will be noted that in the preferred embodiment of my invention shown in Figs. 1–4, the front wall 21 is disposed somewhat rearwardly of the front edge portion of the top wall 16, whereby the front edge portion 16a of the top wall 16 forwardly overhangs the front wall 21 to thereby shade the glass 24 from exterior light such as, for example, the rays of the sun. In addition, I prefer to afford a plurality of blinds or slats 66 projecting forwardly from the front wall 21 at a slightly downwardly inclined angle to thereby further shield the glass 24 from exterior light sources. In this manner, it will be seen that the glass 24 is shielded from the sun's rays so as to assist in preventing the reflection of light from the glass 24 interfering with the visibility of signals emanating from the lamps 41—43 and, also, so that the front of the housing 12 is shaded from the sun's rays so as to assist in preventing the emission of false signals caused by the sun's rays reflected from the panes of glass 35—37. It will be seen that the placing of the frosted glass 24 between the glass panels 35—37 and the front end of the casing 12 also assists in shielding the glass panels 35—37 from the rays of the sun.

In the preferred form of my invention, the lamps 41—43 comprise the sole signal elements embodied on the vehicle 14, for indicating the accelerating, slowing or stopping of the vehicle. However, as will be discussed in greater detail presently, in some instances, it may be desirable to utilize other visible or audible signals in conjunction with the lamps 41—43, such as, for example, the "stop" lights commonly embodied in automobiles today, and the use of the term "signal elements" herein is intended to include not only the lamps 41, 42 and 43, but other elements which might be included therewith such as, for example, the aforementioned "stop" lights and shunts or resistances which may be connected across the individual lamps 41—43, as will be discussed in greater detail hereinafter.

As previously mentioned, in the preferred embodiment of my invention, the signal elements GR, AM and RE are comprised of the lamps 43, 42 and 41, respectively.

Figure 4:
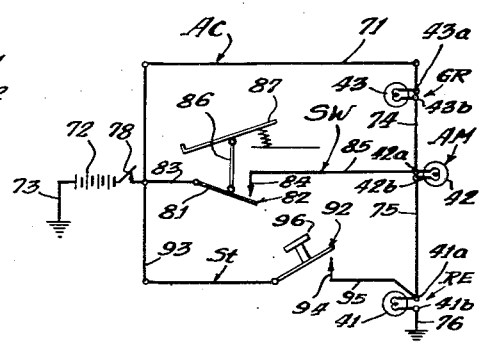
Fig. 4 is a wiring diagram illustrating diagrammatically the preferred circuits embodied in the signal device shown in Figs. 1–3.

As is best seen in Fig. 4, one terminal 43a of the lamp 43 is connected by a wire 71, through a suitable switch 78, such as, for example, the ignition switch of the automobile 14, to one side of a battery 72 which is preferably the usual battery embodied in the automobile 14, the other side of the battery 72 being connected by a suitable connection 73 to ground. The other terminal 43b of the lamp 43 is connected by a wire 74 to one terminal 42a of the lamp 42, and the other terminal 42b of the lamp 42 is connected by a suitable wire 75 to one terminal 41a of the lamp 41. The other terminal 41b of the lamp 41 is connected by a suitable connection 76 to ground. Thus, it will be seen that the lamps 41—43 are connected in series with each other and with the battery 72 by a circuit including the switch 78, wire 71, lamp 43, wire 74, lamp 42, wire 75, lamp 41, and ground connections 76 and 73, which will be hereinafter referred to as the "accelerator circuit" Ac.

The movable contact 81 of a normally closed switch 82, Fig. 4, is connected by a wire 83 to the wire 71. The other or stationary contact 84 of the switch 82 is connected by a wire 85 to the terminal 42a of the lamp 42. The movable contact 81 of the normally closed switch 82 is preferably operably connected by suitable means such as a ball and socket connection 86 to the accelerator pedal 87 of the automobile 14, in a manner whereby when the accelerator pedal is in the normal or raised position shown in solid lines in Fig. 4, the switch 82 is closed, but when the accelerator pedal is depressed, the movable contact 81 is moved by the connection 86 away from the stationary contact 84 to thereby open the switch 82. It will be appreciated that although the contact 81 is shown connected to the accelerator pedal 87 of the vehicle 14, this is shown merely by way of illustration and not by way of limitation and that, if desired, the movable contact 81 may be connected to other manually operable portions of the accelerator mechanism, such as, for example, a hand throttle or to movable linkage of the carburetor, or the like, it merely being desirable that the switch 82 be connected to a portion of the "accelerator" mechanism of the automobile which assumes one position when the automobile is being accelerated or driven at a constant speed and which assumes a different position when the automobile is slowing or stopping.

From the foregoing, it will be seen that through the switch 84, another circuit, which will herein be referred to as the "slowing circuit" Sw, is afforded which is connected in parallel to the accelerating circuit Ac, this slowing circuit Sw comprising the battery 72, the ignition switch 78, the wire 83, the switch 82, the wire 85, the lamp 42, the wire 75, the lamp 41, and the ground connections 76 and 73. Thus, it will be seen that although the slowing circuit Sw is connected in parallel with the accelerating circuit Ac, the signal elements AM and RE are connected in series with each other across the battery 78 in the slowing circuit Sw.

A third circuit, herein referred to as the "stopping circuit" St, is embodied in the signal device 10, and is connected across the battery 72, through a normally open switch 92, in parallel with the accelerating circuit Ac and the slowing circuit Sw, Fig. 4. This stopping circuit St comprises the switch 78; a wire 93 connected at one end to the switch 78; the movable contact 91 of the normally open switch 92 connected to the other end of the wire 93, the stationary contact 94 of the switch 92, a wire 95 connected at one end to the stationary contact 94, the lamp 41 connected by the terminal 41a to the other end of the wire 95, and the ground connections 76 and 73.

The movable contact 91 of the normally open switch 92 is preferably connected to a suitable manually movable portion of the brake system of the automobile 14, such as, for example, the brake pedal 96, and is movable therewith in a manner whereby upon application of the brakes by depression of the brake pedal 96, the movable contact 91 is engaged with the stationary contact 94 to thereby close the switch 92 and energize the circuit St. It will be appreciated, of course, that the movable contact is not necessarily connected to the brake pedal 96, as shown in Fig. 4, but that this is shown merely by way of illustration and not by way of limitation, and that the movable contact 91 may be connected to other parts of the braking system which are actuated in the application of the brakes of the vehicle. Also, it will be appreciated that in making installations of my novel device 10 on automobiles already incorporating a "stop light" switch, the "stop light" switch already embodied in the automobile may be utilized, if desired, as the switch 92.

For the purpose of faciliating the connecting of the various wires to the lamps 41—43, a terminal block 97, including an insulator base 98 having contacts or terminals 99 mounted thereon, is mounted on the top wall 16 by suitable hanger members 100, Figs. 2 and 3, and the wires leading from the terminals of the bulbs 41—43 are interconnected through individual ones of the terminals 99. Connection of the wires 71, 85, and 95 to the battery 72, the switch 82, and the switch 92, respectively, may be made through suitable means such as a socket 115, Figs. 2 and 3, mounted in the rear wall 17 of the casing 12.

From the foregoing, it will be seen that the novel signal device 10 embodies three circuits, namely, the accelerator circuit Ac, the slowing circuit Sw, and the stopping circuit St, connected in parallel with each other in a manner whereby, with the ignition switch 78 turned "on": when the switches 82 and 92 are open, the accelerating circuit Ac is operatively connected to the battery 72, to thereby connect the signal elements GR, AM and RE in series to the battery 72; when the switch 92 is open and the switch 82 is closed, the slowing circuit Sw is operatively connected to the battery 72, to thereby connect the signal elements AM and RE in series to the battery 72 and, because both sides of the signal element GR are connected to the single side of the battery 72 by the closing of the switch 82, disconnect the signal element GR from operative connection with the battery 72; and when the switch 92 is closed, with the switch 82 in either open or closed position, the stopping circuit St is closed to thereby connect the signal element RE to the battery 72 and disconnect the signal elements GR and AM from operative connection with the battery 72, because both sides of these latter signal elements GR and AM are then connected to the same side of the battery 72. Thus, it will be seen that when the stopping circuit St is closed, the signal element RE, alone, is operatively connected across the battery 72; when the switch 82 is closed, and the switch 92 is open, the signal elements AM and RE are operatively connected across the battery 72 and the signal element GR is disconnected from operative connection with the battery 72; when the accelerator switch 82 and the brake switch 92 are both open, the accelerator circuit Ac is operatively closed to thereby connect the signal elements GR, AM and RE in series across the battery 72.

When the accelerator pedal 87 is depressed, and the brake pedal 96 is in outwardly disposed position, so that the automobile is moving along either at a constant speed or being accelerated, it is desirable that a motorist, following behind the vehicle 14, be so advised, and with my novel signal device, this is accomplished by the illumination of the green colored lamp 43 of the signal element GR. Under these circumstances, as previously discussed, the accelerator circuit Ac is closed and the slowing circuit Sw and stopping circuit St are open. Therefore, it will be seen that the signal elements GR, AM and RE are connected in series across the battery 72. I have found that by using signal elements GR, AM and RE in the accelerator circuit Ac having such relative current capacities that when the accelerator circuit Ac is operatively connected across the battery 72, the IR drop across the signal element GR is not less than 69% of the total IR drop of the circuit, the lamp 43 will be illuminated sufficiently to afford a clear and distinct green signal and the lamps 42 and 41 will not be illuminated sufficiently to afford a confusing amber or red signal. However, if the IR drop across the signal element GR is appreciably less than 69% of the total IR drop of the circuit Ac, the lamps 42 and 41 are illuminated to an undesirable extent.

In addition, I have found that, with the switch 82 closed, whereby the signal element GR is disconnected from operative connection with the battery 72, and the signal elements AM and RE are connected in series across the battery 72, in order to illuminate the signal element AM sufficiently to give a readily observable, distinctive amber colored signal to indicate that the vehicle 14 is slowing down, and not illuminate the lamp 41 sufficiently to give a confusing red signal, the relative current capacities of the signal element AM and the signal element RE should be such that when the slowing circuit Sw is operatively connected across the battery 72, the IR drop across the signal element AM is not less than 69% of the total IR drop of the circuit Sw. In this manner, it is assured that the lamp 42 will be illuminated sufficiently to give a clear observable amber signal, but the lamp 41 will not be illuminated sufficiently to give a confusing red signal.

In the preferred form of my invention as shown in Figs. 1 to 4, inclusive, wherein each of the signal elements GR, AM and RE comprise only a single signal lamp or bulb 43, 42 and 41, respectively, as previously discussed, various combinations of lamps or bulbs readily available on the market may be used to afford the aforementioned desired current capacity characteristics of the signal elements 41—43.

The results of tests of typical combinations of bulbs readily available on the market which I have found to be suitable for use in a signal device constructed in accordance with the principles of the preferred embodiment of my invention is shown in Table I which is set forth hereinafter.

As will be appreciated by those skilled in the art, the common automobile circuit of today is nominally rated at six to eight volts but, normally, during normal operation of such an automobile, the voltage applied to the lighting circuit thereof varies between substantially 5.6 volts and 7.5 volts. Thus, in Table I, which is incorporated hereinafter, I have shown the results of tests of various combinations of lamps which are suitable for use in my novel signal device 10, the tests of each combination being carried out under conditions wherein voltages of 5.6, 6.5 and 7.5 are applied to the lighting circuits, which voltages correspond substantially to the normal operating voltages of the lighting circuits of an automobile which is idling, moving slowly through traffic, and which is being driven at normal highway speeds, respectively. The lamps in the Table I, and the other tables embodied hereinafter are identified according to candlepower rating and by type numbers, which is the standard means of identifying such bulbs in the trade, and which identifications are uniformly applied to lamps used in the lighting circuits of automobiles, by General Electric Company, and others.

From a consideration of Table I, it will be seen that the tests are listed therein in a manner wherein the least desirable combination is listed first as "Test A" and the progressively more desirable combinations are listed in order thereinafter, ending with "Test E," which comprises the most desirable combination listed in Table I.

From the foregoing it will be seen that, in the preferred form of my invention, the novel signal device 10, as shown in Figs. 1 to 4, inclusive, embodies a plurality of signal elements GR, AM and RE each comprising an individual bulb or lamp 43, 42 and 41, respectively, with the signal elements connected in a novel manner in a series-parallel circuit, and with the relative current capacities of the lamps 41—43 controlled within certain limits, whereby, under control of two switches operated by the accelerator mechanism and the braking mechanism of the automobile, respectively, the individual bulbs of the respective signal elements may be selectively energized to thereby emit a single distinctively colored signal to indicate to a following motorist whether the automobile is accelerating, slowing or stopping.

TABLE I

| Test | Signal Element | Type No. of Bulb | Candle-Power Rating of Bulb | 5.6 Volt Circuit | | 6.5 Volt Circuit | | 7.5 Volt Circuit | |
|---|---|---|---|---|---|---|---|---|---|
| | | | | Percent of Total Circuit IR Drop | | Percent of Total Circuit IR Drop | | Percent of Total Circuit IR Drop | |
| | | | | Switches 82 and 92 Open | Switch 82 Closed and Switch 92 Open | Switches 82 and 92 Open | Switch 82 Closed and Switch 92 Open | Switches 82 and 92 Open | Switch 82 Closed and Switch 92 Open |
| A | GR | 55 | 2 | 73.2 | ------ | 70.0 | ------ | 69.3 | ------ |
|   | AM | 63 | 3 | 22.3 | 78.6 | 23.5 | 76.9 | 24.0 | 75.3 |
|   | RE | 81 | 6 | 4.5 | 21.4 | 6.5 | 23.1 | 6.7 | 24.7 |
| B | GR | 44 | 1¼ | 89.3 | ------ | 89.2 | ------ | 87.3 | ------ |
|   | AM | 63 | 3 | 7.2 | 78.6 | 7.7 | 76.9 | 8.7 | 75.3 |
|   | RE | 81 | 6 | 3.5 | 21.4 | 3.1 | 23.1 | 4.0 | 24.7 |
| C | G | 51 | 1 | 95.5 | ------ | 93.7 | ------ | 94.7 | ------ |
|   | A | 63 | 3 | 3.6 | 78.6 | 3.2 | 76.9 | 3.3 | 75.3 |
|   | R | 81 | 6 | .8 | 21.4 | 3.1 | 23.1 | 2.0 | 24.7 |
| D | G | 55 | 2 | 92.0 | ------ | 88.5 | ------ | 90.0 | ------ |
|   | A | 81 | 6 | 4.5 | 81.0 | 7.7 | 79.2 | 8.7 | 78.7 |
|   | R | 87 | 15 | 3.5 | 19.0 | 3.8 | 20.8 | 2.3 | 21.3 |
| E | G | 51 | 1 | 89.3 | ------ | 87.7 | ------ | 85.3 | ------ |
|   | A | 55 | 2 | 8.9 | 92.9 | 10.0 | 93.7 | 12.0 | 92.0 |
|   | R | 81 | 6 | 1.8 | 7.1 | 2.3 | 6.3 | 2.7 | 8.0 |

Figure 5:
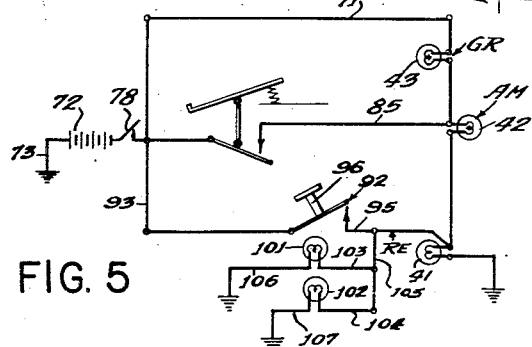
Fig. 5 is a wiring diagram similar to Fig. 4, illustrating a modified form of my invention.

Although, as previously mentioned, in the preferred embodiment of my invention, the signal elements GR, AM and RE of the signal device 10 are substantially entirely self-contained comprising individual lamps 43—41, in some instances, it may be desirable to include in the signal element RE the "stop lights" of the automobile on which the device is to be mounted, with the signal lamp 41 connected in parallel with the "stop lights" which are already embodied on the usual automobile available on the market today. By connecting the signal device 10 to the stop lights of the automobile 14 in the manner shown in Fig. 5, which illustrates a modified form of my invention, this may be readily accomplished. Thus, it will be seen that in Fig. 5 is illustrated the same circuit shown in Fig. 4, except that the stop lights 101 and 102 of the vehicle 14 are connected in parallel with the bulb 41 of the signal element RE. In making this addition to the preferred circuit shown in Fig. 4, the terminals 101a and 102a of the stop-lights 101 and 102 are connected to ground by connections 106 and 107, respectively, and the opposite terminals 101b and 102b of the stop-lights 101 and 102 are connected by wires 103 and 104, respectively, to one end of a wire 105, the other end of which is connected to the wires 95 between the switch 92 and the bulb 41. Thus, in this instance, it will be seen that the signal element GR comprises the lamp 43, the signal element AM comprises the lamp 42, and the signal element RE comprises the lamp 41 and the "stop lights" 101 and 102.

TABLE II

| Test | Signal Element | Type No. of Bulb | Candle-Power Rating of Bulb | 5.6 Volt Circuit | | 6.5 Volt Circuit | | 7.5 Volt Circuit | |
|---|---|---|---|---|---|---|---|---|---|
| | | | | Percent of Total Circuit IR Drop | | Percent of Total Circuit IR Drop | | Percent of Total Circuit IR Drop | |
| | | | | Switches 82 and 92 Open | Switch 82 Closed and Switch 92 Open | Switches 82 and 92 Open | Switch 82 Closed and Switch 92 Open | Switches 82 and 92 Open | Switch 82 Closed and Switch 92 Open |
| F | GR | 55 | 2 | 69.6 | ------ | 70.0 | ------ | 70.1 | ------ |
|   | AM | 63 | 3 | 26.8 | 70.0 | 24.6 | 72.3 | 24.0 | 73.3 |
|   | RE | 55/63 | 2/3 | 3.6 | 30.0 | 5.4 | 27.7 | 5.9 | 26.7 |
| G | GR | 63 | 3 | 75.0 | ------ | 74.6 | ------ | 74.0 | ------ |
|   | AM | 81 | 6 | 23.2 | 97.3 | 24.6 | 98.5 | 24.0 | 97.4 |
|   | RE | 1129/1129/81 | 48 | 1.8 | 2.7 | .8 | 1.5 | 2.0 | 2.6 |
| H | GR | 63 | 3 | 89.3 | ------ | 87.7 | ------ | 86.7 | ------ |
|   | AM | 81/55 | 8 | 8.9 | 91.0 | 10.7 | 89.2 | 11.3 | 89.3 |
|   | RE | 1129/81 | 27 | 1.8 | 9.0 | 1.6 | 10.8 | 2.0 | 10.7 |
| I | GR | 44 | 1¼ | 91.0 | ------ | 90.8 | ------ | 89.3 | ------ |
|   | AM | 63 | 3 | 7.1 | 92.9 | 7.7 | 93.1 | 9.3 | 92.0 |
|   | RE | 81/63 | 9 | 1.9 | 7.1 | 1.5 | 6.9 | 1.4 | 8.0 |
| J | GR | 63 | 3 | 94.6 | ------ | 94.4 | ------ | 94.7 | ------ |
|   | AM | 81/81 | 12 | 3.6 | 89.3 | 2.9 | 89.2 | 4.0 | 89.3 |
|   | RE | 1129/1129 | 42 | 1.8 | 10.7 | 2.7 | 10.8 | 1.3 | 10.7 |
| K | GR | 55 | 2 | 91.0 | ------ | 90.1 | ------ | 89.3 | ------ |
|   | AM | 81 | 6 | 7.3 | 97.3 | 7.7 | 98.5 | 9.3 | 97.2 |
|   | RE | 1129/1129/81 | 48 | 1.7 | 2.7 | 2.2 | 1.5 | 1.4 | 2.8 |
| L | GR | 55 | 2 | 92.0 | ------ | 91.5 | ------ | 90.7 | ------ |
|   | AM | 81 | 6 | 7.1 | 97.3 | 7.7 | 96.9 | 8.0 | 96.7 |
|   | RE | 1129/81 | 27 | .9 | 2.7 | .8 | 3.1 | 1.3 | 3.3 |
| M | GR | 44 | 1¼ | 94.6 | ------ | 96.2 | ------ | 96.0 | ------ |
|   | AM | 81 | 6 | 3.5 | 97.3 | 3.1 | 96.9 | 3.3 | 96.7 |
|   | RE | 1129/81 | 27 | 1.9 | 2.7 | .7 | 3.1 | .7 | 3.3 |

As previously discussed, the with respect to the preferred form of my invention shown in Figs. 1 to 4, I have found that to enable the signal elements of the novel signal device 10 to give readily visible selective signals to indicate acceleration, or normal driving of the vehicle 14, slowing of the vehicle 14, and stopping of the vehicle 14, respectively, the current capacities of the signal elements GR, AM and RE should be such that, with the acceleration circuit Ac operatively connected across the erating circuit AC and the slowing circuit Sw, respectively.

The results of tests of typical combinations of signal elements GR, AM and RE, embodying as a part thereof shunt resistances, or the like, are shown in Table III. As in Tables I and II, the tests listed in Table III are listed in order of preferred combinations, Test N embodying the least desirable combination listed, and Test P embodying the most desirable combination listed.

TABLE III

| Test | Signal Element | Type No. of Bulb | Candle-Power Rating of Bulb | 5.6 Volt Circuit | | 6.5 Volt Circuit | | 7.5 Volt Circuit | |
|---|---|---|---|---|---|---|---|---|---|
| | | | | Percent of Total Circuit IR Drop | | Percent of Total Circuit IR Drop | | Percent of Total Circuit IR Drop | |
| | | | | Switches 82 and 92 Open | Switch 82 Closed and Switch 92 Open | Switches 82 and 92 Open | Switch 82 Closed and Switch 92 Open | Switches 82 and 92 Open | Switch 82 Closed and Switch 92 Open |
| N | GR | 63 | 3 | 69.8 | | 69.2 | | 69.3 | |
| | AM | 63 | 3 | 25.0 | 74.1 | 23.1 | 73.1 | 23.4 | 73.3 |
| | RE | 8 oh. shunt 81 | 6 | 5.2 | 25.9 | 7.7 | 26.9 | 7.3 | 26.7 |
| O | GR | 3.2 oh. shunt 63 | 3 | 72.3 | | 71.5 | | 70.7 | |
| | AM | 81 | 6 | 21.8 | 78.6 | 21.6 | 80.0 | 22.6 | 80.0 |
| | RE | 81 | 6 | 5.9 | 21.4 | 6.9 | 20.0 | 6.7 | 20.0 |
| P | GR | 3.2 oh. shunt 63 | 3 | 85.7 | | 84.6 | | 84.7 | |
| | AM | 81 | 6 | 12.5 | 95.5 | 13.8 | 96.9 | 14.7 | 93.3 |
| | RE | 8 oh. shunt 1129 1129 81 | 48 | 1.8 | 4.5 | 1.6 | 3.1 | .6 | 6.7 | battery 72, the IR drop across the signal element GR should not be substantially less than 69% of the total IR drop of the circuit Ac, and, with the slowing circuit Sw operatively connected across the battery 72, the IR drop across the signal element AM should not be substantially less than 69% of the total IR drop of the circuit Sw. This is equally true in the modified form of my invention, shown in Fig. 5, wherein the signal element RE comprises a plurality of bulbs connected in parallel.

The results of tests of typical combinations of signal elements GR, AM and RE, of various current capacities is shown in Table II, wherein the combination shown embody two or more lamps connected in parallel in the signal element RE as would be the situation in automobiles of today, wherein the lamp 41 would be connected in parallel with the "stop lights" of the automobile as shown in Fig. 5, some of the examples merely showing one stop light and the others showing two stop lights. As in Table I, the tests listed in Table II are listed in order of preferred combinations, Test F embodying the least desirable combination listed, and Test M embodying the most desirable combination listed.

Figure 6:
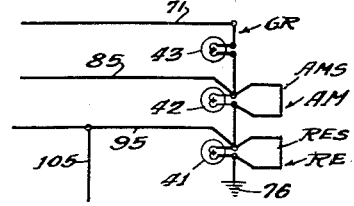
Fig. 6 is a wiring diagram similar to Fig. 4, illustrating a further modified form of my invention.

As will be appreciated, in some instances, and especially when the supply of various size bulbs which are available is limited, such as, for example, during war-time, and the like, it is somewhat difficult to insure that bulbs of the desired different capacities will be available which will have the desired variations in current capacities, and under such conditions, it may be necessary to use bulbs which, alone, would not give the proper variations, and to incorporate with the bulbs, suitable resistances, such as the shunt resistances AMS and RES, embodied in the signal elements AM and RE, across the lamps 42 and 41, respectively, as shown in the modified form of my invention shown in Fig. 6.

It will be seen that in Fig. 6 the same circuit is used as is shown in Fig. 4, the only difference being that the resistance AMS and RES are connected across the bulbs 42 and 41, respectively, in parallel to thereby vary the current capacities of the signal elements AM and RE from the capacities which would be present if merely the lamps 42 and 41 were used. Therefore, it is considered necessary to show only the one end of the circuits embodying the changes in Fig. 6.

As in the forms of my invention shown in Figs. 1 to 4, inclusive, and Fig. 5, respectively, the current capacities of the signal elements GR, AM and RE in the modified form of my invention shown in Fig. 6, are such that the IR drop across the signal elements GR and AM, respectively, is not less than 69% of the total IR drop across the accelerating circuit AC and the slowing circuit Sw, respectively.

From the foregoing, it will be seen that various means of accomplishing my invention may be used without departing from the purview of my invention, and that in each instance the variations are such that the objects strived for is to vary the current capacities of the signal elements GR, AM, and RE in such a manner that when all three signal elements are operatively connected in series across the battery 72, the IR drop across the signal element GR is not substantially less than 69% of the total IR drop of the circuit; and when the signal elements AM and RE are the only elements connected across the battery 72, the IR drop across the signal element AM is not substantially less than 69% of the total IR drop of that circuit.

From the foregoing, it will be seen that I have afforded a novel signal device which may be readily used on the present day automobiles, and the like, as a complete integral device, or which may incorporate as a part thereof, the "stop lights" which are normally present on an automobile today.

Also, it will be seen that a signal device embodying my invention, when mounted on an automobile, affords a novel and practical signal to following motorists indicating whether the car is being driven at a constant or accelerating speed, slowing down, or stopping.

In addition, it will be seen that the specific construction of my novel signal device may be changed in various ways without departing from the purview of my invention, and that various means of varying the relative current capacities of the signal elements GR, AM, and RE, to enable the desired limits to be maintained, may be resorted to without departing from the purview of my invention.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A signal device comprising a source of electric current, three electric circuits connected to said source of current, one of said circuits including a "stopping" lamp, the second of said circuits including said "stopping" lamp and a "slowing" lamp connected in series, the third of said circuits including said "stopping" lamp, said "slowing" lamp, and an "accelerating" lamp connected in series, and switch means in said one and second circuits and operable to open and close said circuits for selectively controlling the operable connection of said one circuit, said second circuit, and said third circuit to said source of current.

2. The combination with an automobile vehicle of the type having a source of electric current, manually operable means for effecting movement of the vehicle, and other manually operable means for effecting stopping of the vehicle is a positive manner, of three electric circuits connected to said source of current, one of said circuits including a "stop" lamp, the second of said circuits including said "stop" lamp and a "slow" lamp connected in series, the third of said circuits including said "stop" lamp, said "slow" lamp, and an "accelerating" lamp connected in series, said one circuit and said second circuit being connected in parallel with said third circuit and each other, and switch means in said one and second circuits for selectively opening and closing said one and second circuits, said switch means comprising a normally closed switch connected in said second circuit and operatively connected to said first mentioned manually operable means and operable thereby into open position when said first mentioned manually operable means are actuated to effect movement of said vehicle, and a normally open switch connected in said one circuit and operatively connected to said other manually operable means and operable thereby into closed position when said other manually operable means are actuated to effect stopping of said vehicle.

3. A signal device for use in automotive vehicles, and the like, having a source of electric current, said signal device comprising three parallel circuits adapted to be connected in parallel to said source of current, one of said circuits including an electrically operable signal element, the second of said circuits including said signal element and a second electrically operable signal element connected in series, the third of said circuits including said first mentioned signal element, said second signal element, and another electrically operable signal element connected in series, and means connected to said circuits for selectively operatively connecting said circuits to said source of current, the respective electrical characteristics of said signal elements being such that when said third circuit is so operatively connected to said source of current the "IR Drop" across said other signal element is not less than sixty-nine percent of the total "IR Drop" of said third circuit.

4. A signal device for use in automotive vehicles, and the like, having a source of electric current, said signal device comprising three parallel circuits adapted to be connected in parallel to said source of current, one of said circuits including an electrically operable signal element, the second of said circuits including said signal element and a second electrically operable signal element connected in series, the third of said circuits including said first mentioned signal element, said second signal element, and another electrically operable signal element connected in series, and means connected to said circuits for selectively operatively connecting said circuits to said source of current, the respective electrical characteristics of said signal elements being such that when said second circuit is so operatively connected to said source of current the "IR Drop" across said second signal element is not less than sixty-nine percent of the total "IR Drop" of said second circuit.

5. A signal device for use in automotive vehicles, and the like, having a source of electric current, said signal device comprising three parallel circuits adapted to be connected in parallel to said source of current, one of said circuits including an electrically operable signal element, the second of said circuits including said signal element and a second electrically operable signal element connected in series, the third of said circuits including said first mentioned signal element, said second signal element, and another electrically operable signal element connected in series, and means connected to said circuits for selectively operatively connecting said circuits to said source of current, the respective electrical characteristics of said signal elements being such that, when said third circuit is so operatively connected to said source of current, the "IR Drop" across said other signal element is not less than sixty-nine percent of the total "IR Drop" of said third circuit, and, when said second circuit is so operatively connected to said source of current, the "IR Drop" across said second signal element is not less than sixty-nine percent of the total "IR Drop" of said second circuit.

6. A signal device for use in automotive vehicles, and the like, having a source of electric current, said signal device comprising three parallel circuits adapted to be connected in parallel to said source of current, one of said circuits including an electrically operable signal lamp, the second of said circuits including said signal lamp and a second electrically operable signal lamp connected in series, the third of said circuits including said first mentioned signal lamp, said second signal lamp, and another electrically operable signal lamp connected in series, and means connected to said circuits for selectively operatively connecting said circuits to said source of current, the respective electrical characteristics of said signal lamps being such that, when said third circuit is so operatively connected to said source of current, the "IR Drop" across said other signal lamp is not substantially less than 69.3 percent of the total "IR Drop" of said third circuit, and, when said second circuit is so operatively connected to said source of current, the "IR Drop" across said second signal lamp is not substantially less than 75.3 percent of the total "IR Drop" of said second circuit.

7. A signal device for use in automotive vehicles, and the like, having a source of electric current and a stop-lamp, said signal device comprising three parallel circuits adapted to be connected in parallel to said source of current, one of said circuits including an electrically operable signal element, the second of said circuits including said signal element and a second electrically operable signal element connected in series, the third of said circuits including said first mentioned signal element, said second signal element, and another electrically operable signal element connected in series, and means connected to said one and second circuits for selectively controlling the operable connection of said one, second and third circuits to said source of current, said first mentioned signal element comprising said stop-lamp and a signal lamp connected together in parallel in each of said three circuits, the relative current capacities of said signal elements being such that when said third circuit is operably connected to said source of current the "IR Drop" across said other signal element is not substantially less than 69.6 percent of the total "IR Drop" of said third circuit, and when said second circuit is operably connected to said source of current the "IR Drop" across said second signal element is not substantially less than seventy percent of the total "IR Drop" of said second circuit.

8. A signal device for use in automotive vehicles, and the like, having a source of electric current, said signal device comprising three parallel circuits adapted to be connected in parallel to said source of current, one of said circuits including an electrically operable signal element, the second of said circuits including said signal element and a second electrically operable signal element connected in series, the third of said circuits including said first mentioned signal element, said second signal element, and another electrically operable signal element connected in series, and means connected to said one and second circuits for selectively controlling the operable connection of said one, second and third circuits to said source of current, predetermined ones of said signal elements comprising an electric lamp and a shunt connected in parallel in respective ones of said circuits, the relative current capacities of said signal elements being such that, when said third circuit is operably connected to said source of current, the "IR Drop" across said other signal element is not substantially less than 69.2 percent of the total "IR Drop" across said third circuit, and, when said second circuit is operably connected to said source of current, the "IR Drop" across said second signal element is not substantially less than 73.1 percent of the total "IR Drop" of said second circuit.

9. The combination with an automotive vehicle of the type having a source of electric current, an accelerator, a brake actuator, a normally open electric switch connected to said brake actuator and operable thereby, a stop lamp, and an electric circuit including said switch and stop lamp connected together in series, of three circuits connected in parallel and connected to said source of electric current, one of said circuits including said first mentioned circuit and a second stop lamp connected in parallel with said first mentioned stop lamp, said second stop lamp and said first mentioned stop lamp affording one signal element, said one signal element being connected in said one circuit in series with said current supply and said normally open switch, a second circuit including said one signal element, a second electrical signal element, and a normally closed switch connected in series in said second circuit, said normally closed switch being operatively connected to said accelerator and openable and closeable thereby, and a third circuit including said one signal element, said second signal element and a third signal element connected in series with each other, said second signal element being connected between said one signal element and said third signal element in said third circuit, the connection of said one signal element to said source of current in said one circuit being between said one signal element and said second signal element, and the connection of said one signal element and said second signal element to said source of current in said second circuit being between said second signal element and said third signal element.

10. A signal device for use in an automotive vehicle of the type including a source of electric current, said signal device comprising a "stopping" signal element, a "slowing" signal element, an "accelerating" signal element, three circuits adapted to be connected to said source of current, said circuits being in parallel to each other, one of said circuits including said "stopping" signal element, the second of said circuits including said "stopping" signal element and said "slowing" signal element connected in series with each other, and the third of said circuits including said "stopping" signal element and said "accelerating" signal element connected in series with each other, and means for selectively controlling the energization of each of said signal elements, said means comprising two switches, one of said switches being normally closed and being connected in said second circuit, and the other of said switches being normally open and being connected in said one circuit.

References Cited in the file of this patent

UNITED STATES PATENTS

| Number | Name | Date |
| --- | --- | --- |
| 2,096,069 | Seiden | Oct. 19, 1937 |
| 2,128,769 | Finnell | Aug. 30, 1938 |
| 2,250,133 | Pearce et al. | July 22, 1941 |
| 2,260,680 | Nelsen | Oct. 28, 1944 |
| 2,483,687 | Wisuri | Oct. 4, 1949 |
| 2,500,201 | Porter | Mar. 14, 1950 |
| 2,513,712 | Coomes | July 4, 1950 |